Aug. 14, 1923.                                                      1,465,003
W. H. SCHULZE
DIFFERENTIAL SHAFT DRIVE FOR SPEEDOMETERS AND THE LIKE
Filed July 19, 1922          2 Sheets-Sheet 1
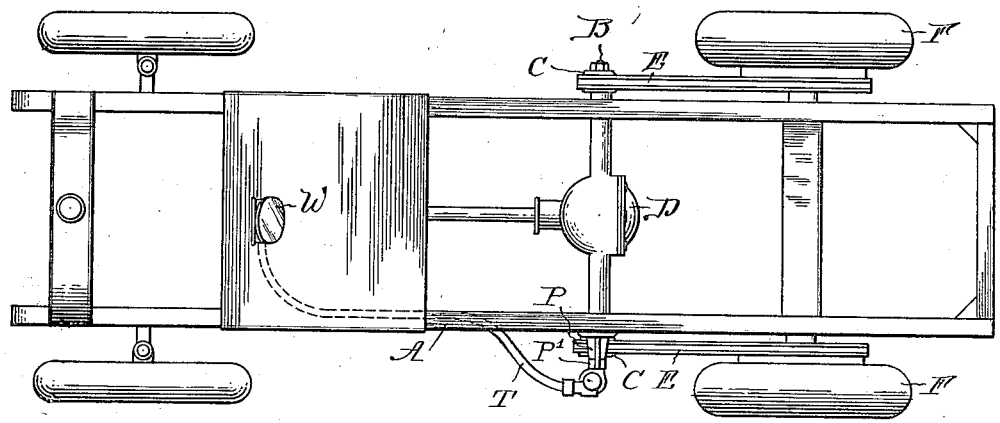
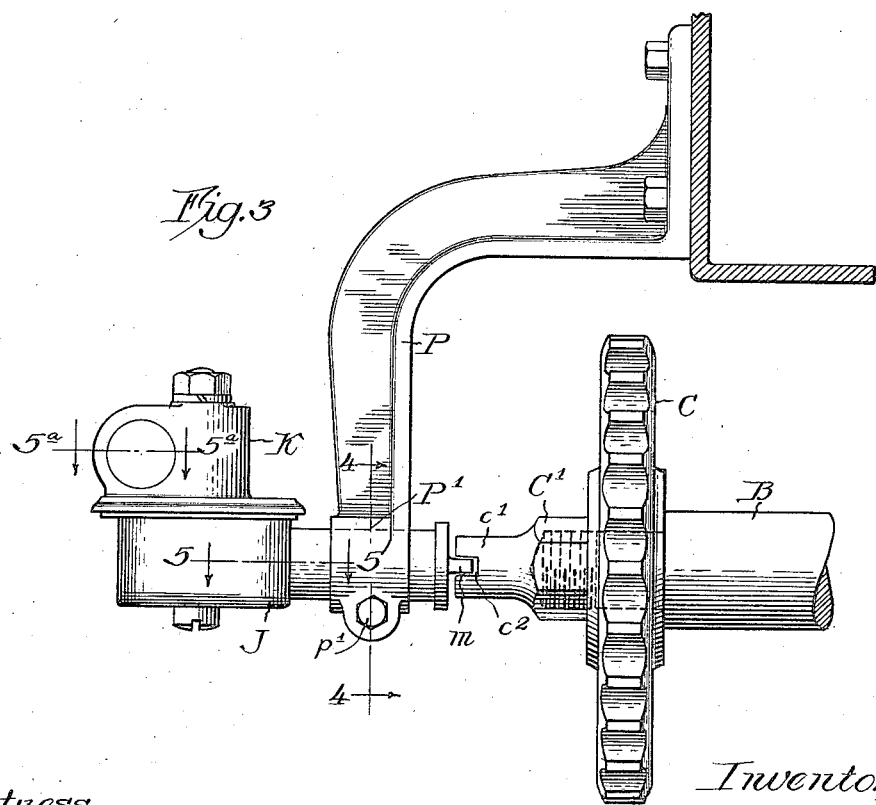

Aug. 14, 1923.
W. H. SCHULZE
1,465,003
DIFFERENTIAL SHAFT DRIVE FOR SPEEDOMETERS AND THE LIKE
Filed July 19, 1922   2 Sheets-Sheet 2
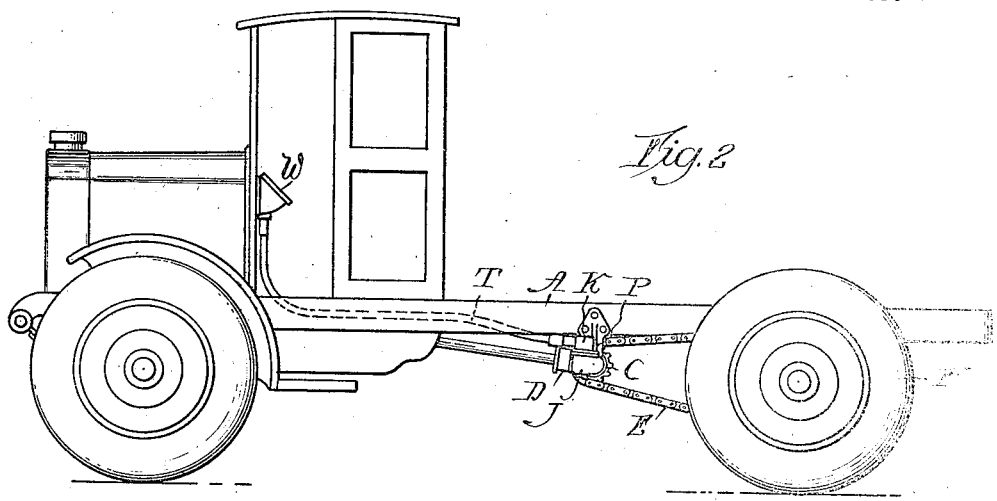
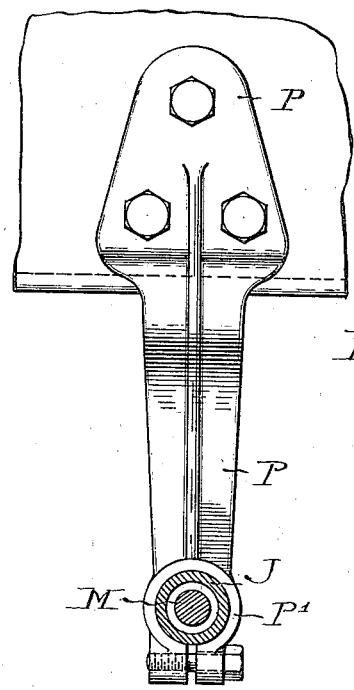
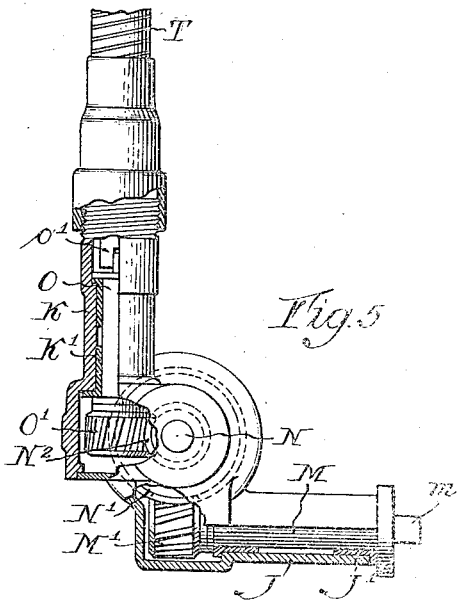
Inventor,
William H. Schulze,
By Burton & Burton Patented Aug. 14, 1923.

1,465,003

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

DIFFERENTIAL SHAFT DRIVE FOR SPEEDOMETERS AND THE LIKE.

Application filed July 19, 1922. Serial No. 576,113.

*To all whom it may concern:*

Be it known that I, WILLIAM H. SCHULZE, a citizen of the United States, residing in the city of Chicago, in the county of Cook and State of Illinois, have invented certain new and useful Improvements in Differential Shaft Drives for Speedometers and the like, of which the following is a specification, reference being had to the accompanying drawings, forming a part thereof.

The purpose of this invention is to provide an improved construction for driving a travel-indicating instrument, as a speedometer, odometer, and the like, from a differential-driven shaft of the vehicle drive train in which the rear wheels are driven by gear or chain connection with the differential driven shafts, respectively. It consists in the elements and features of construction shown and described, as indicated in the claims.

In the drawings:—

Figure 1 is a diagrammatic plan view showing the chassis of a motor truck equipped with this invention.

Figure 2 is a side elevation of the same.

Figure 3 is a detail section at the line, 3—3, on Figures 1 and 2 on an enlarged scale.

Figure 4 is a section at the line, 4—4, on Figure 3.

Figure 5 is a detail top plan view of the flexible gear joint employed in the drive connection, partly sectional at two planes, 5—5, and $5^a$—$5^a$, on Figure 3.

The drawings show a familiar type of motor truck chassis, in which the frame, A, is carried on rear drive wheels, F, F, which are driven respectively by drive chains, E, E, from sprocket pinions, C, C, on the outer end of the differential-driven transverse shaft, B, B, in alignment with each other from the differential indicated by the casing, D, the sprockets, C, C, being on the outside of the longitudinal frame bars, past which the shafts, B, B, extend below said frame bars, which support the differential casing and the shaft casings which afford the journal bearings for said differential-driven shafts, in the familiar or usual manner not shown. The sprocket wheels, C, C, are customarily fast on the ends of the two driven shafts, B, B, fitting and secured on reduced end portions of said shafts, respectively, whose reduced ends are each exteriorly threaded to receive a clamping nut securing the sprocket wheel. For the purpose of the present invention there is substituted for this clamping nut a special nut, $C^1$, having an extension, $c^1$, adapted for driving engagement with a shaft to be provided in a fitting containing connections for driving engagement with a flexible shaft to be extended to the indicating instrument. The fitting referred to is of the general character of a "swivel gear joint," so-called, the same being a gear housing comprising two members, J and K, which are swiveled together about the axis of an intermediate shaft journaled therein, as hereinafter described, said two members, J and K, terminating respectively in journal bearings, $J^1$ and $K^1$, for the in-leading and out-leading shafts, M and O, respectively, intermediate with which, coincident with the swivel axis of the two members of the housing there is journaled a third shaft, N, which is driven by the shaft, M, by means of intermeshing spiral gears, $M^1$ and $N^1$, on said shafts, M and N, respectively, and which drives the shaft, O, by intermeshing gears, $N^2$ and $O^1$ on said shafts, N and O, respectively. The construction of this swivel gear housing or joint is familiar and need not be further described. The journal bearing, $J^1$, for the shaft, M, is exteriorly cylindrical and adapted to be held in a split bearing or seat, $P^1$, formed at the lower end of a bracket, P, which is rigidly mounted upon the side bar, A, of the chassis frame and depends outwardly therefrom into alignment with the shaft of the sprocket wheel, C. The bearing, $J^1$, is of sufficiently greater length than the axial width of the clamp seat, $P^1$, of the bracket, P, to permit some adjustment of the housing longitudinally of said journal bearing for properly engaging the end of the shaft, M, which protrudes from said bearing with the coupling nut, $C^1$, said protruding end of said shaft, M, being provided with a suitable projection, $m$, for engaging the cross slot, $c^2$, of said coupling, $C^1$. At the same time it will be observed that the entire housing, J, K, can be adjusted angularly about the axis of the journal bearing, $J^1$, in said clamp seat, $P^1$, and secured at any angular adjustment therein by tightening the clamp nut, $p^1$. The extremity of the journal bearing, $J^1$, of the part, J, of the housing in which the shaft, O, is journaled, is exteriorly threaded for engagement with the casing of the flexible shaft, T; and the shaft, O, journaled in said bearing, $J^1$, is suitably terminated for driving engagement with the rotary shaft member of said flexible shaft, T, as seen at $o^1$ in Figure 5.

Upon considering the structure above described, it will be understood that the housing, K, being adjustable angularly at its securement in the clamp seat, $P^1$, of the bracket, P, further accommodates itself to the trend of the flexible shaft, T, by swiveling of the two housing members about the axis of the shaft, N, thereby permitting the flexible shaft, T, to extend in the most desirable and least movement-impairing direction and course to the indicating instrument, W, mounted in whatever position may be found most convenient upon the vehicle.

I claim:—

1. In a motor vehicle, in combination with a rear wheel drive chain, comprising a transverse power shaft from the differential, and a sprocket thereon outside the frame, a bracket depending outwardly from the fore-and-aft frame bar, having at its lower end, means alinged with said power shaft for holding a shaft bearing; a gear housing comprising two members swiveled together, and intermeshing gears therein with their driven and driving shafts, respectively, protruding from the respective members of the housing; a coupling member fast on the protruding end of the sprocket-carrying shaft, engaging the in-leading or driven shaft of the housing, and a flexible shaft having its casing and rotary shaft members, respectively, operatively coupled to the other housing member and to the other shaft protruding therefrom.

2. In a motor vehicle, in combination with a rear wheel chain drive, comprising a transverse power shaft from the differential and a sprocket thereon outside the frame, a bracket depending outwardly from the fore-and-aft frame bar, having at its lower end a terminal suitable for holding a shaft bearing; a gear housing comprising two members swiveled together, each terminating in a shaft bearing; intermeshing gears and their respective shafts constituting a train housed in said housing with the in-leading and out-leading shafts journaled in said shaft bearings of the two housing members respectively, the bearing of the in-leading shaft being held in said bracket terminal; a coupling fast on the protruding end of the sprocket-carrying shaft, engaging the end protruding from the housing of said in-leading shaft, the out-leading shaft and the end of its journal bearing being adapted respectively for coupling to the rotary shaft member and to the casing of the flexible shaft.

3. In combination with a motor truck having a differential mechanism and two aligned shafts driven therethrough and extending respectively to opposite side of the frame for driving connection to the rear driving wheels, respectively, a travel indicator drive connection removably mounted on the outer side of the frame member in which the outer end of one of said differential drive shafts is carried, and shaft coupling means for engaging the in-leading shaft of said drive commission with the outer end of said differential-driven shaft.

4. In a motor vehicle having a transverse power shaft from the differential of the motor carrying-and-traction wheel driving train, and a power communicating wheel at the outer end of said shaft from which the traction wheel is driven, said power-communicating wheel being secured on said shaft by a nut on the end of the shaft, said nut being a cap nut and constructed at its outer end for coupling by endwise advance of a coupling member there-toward, in combination with a gear housing comprising journal bearings, driving and driven shafts and intermeshing gears thereon in said journal bearing and housing, the projecting end of said driving shaft being adapted for coupling with said coupling nut, and a bracket mounted on the vehicle frame having means for holding the housing by engaging the bearings of said projecting shaft.

In testimony whereof, I have hereunto set my hand at Chicago, Illinois, this 14th day of July, 1922.

WILLIAM H. SCHULZE.